Sept. 30, 1952     L. R. HILL ET AL     2,611,930

INSULATING ELECTRICAL APPARATUS

Filed Aug. 6, 1948

WITNESSES:
H. F. Susser.
Robert E. Ross

INVENTORS
Lawrence R. Hill and
John A. Campbell.
BY Frederick Shapoe
ATTORNEY

Patented Sept. 30, 1952

2,611,930

UNITED STATES PATENT OFFICE 2,611,930

INSULATING ELECTRICAL APPARATUS

Lawrence R. Hill, Pittsburgh, Pa., and John A. Campbell, Lawson, Mo., assignors to Westinghouse Electric Corporation, East Pittsburgh, Pa., a corporation of Pennsylvania Application August 6, 1948, Serial No. 42,824

2 Claims. (Cl. 18—59)

1

This invention relates generally to the insulation of electrical apparatus and, more particularly, to the impregnation of electrical members with an insulating resin.

Electrical members such as stators and rotors for dynamo-electric machines are usually subjected to an impregnation treatment after winding, to fill the voids in the windings with an insulating resin. The insulating resin impregnant serves to prevent moisture and dirt from penetrating into the machine, and assists in maintaining the individual conductors of the coils rigidly in position in the machine during operation. The impregnant also is intended to increase the rate of heat transfer from the coils, which allows the machine to be operated at a higher power output than would be possible if the machine were not impregnated.

The impregnation of the electrical member is usually accomplished by placing the member in a sealed chamber, evacuating the chamber, and allowing the insulating varnish to flow into the chamber and cover the member. Pressure may be applied to the chamber to assist in impregnating the internal voids within the member, and the member is then removed from the chamber and subjected to a heat treatment to solidify the varnish.

However, during the transfer of the impregnated member from the impregnating chamber to a heating chamber in which the fluid varnish may be cured to the solid state, the varnish flows out of the member, leaving undesirable voids within the windings. The varnishes commonly used for impregnation frequently contain more than 50% by weight of a volatile solvent to render the varnish sufficiently fluid to penetrate interstices of the electrical members. This solvent must be evaporated from the members during the heating operation after impregnation. Hence even if all the impregnating varnish could be retained in the member, voids would nevertheless occur due to evaporation of the solvent.

In some applications as for example in treating electric motors, it is necessary that the end windings of the machine be provided with a smooth external surface, free from any projections or other irregularities. This is particularly desirable for motors which are to be used on textile looms. In such applications, motor operation is frequently impaired by lint and textile fibers accumulating unduly on such irregularities. Ordinary varnish impregnation treatment does not prevent surface irregularities of end windings.

The object of this invention is to provide a process for impregnating an electrical member with an insulating resin, in which the resin is retained in the member after impregnation by a tightly fitting flexible membrane applied to the member prior to impregnation.

2

A further object of the invention is to provide a process for applying a smooth layer of resin to the end windings of electrical apparatus.

A still further object is to provide a method for impregnating an electrical member whereby the impregnant provides a smooth exterior surface on exposed windings of the electrical member by reason of its being contained in a tightly fitting flexible membrane surrounding the member.

For a fuller understanding of the nature and objects of the invention, reference should be had to the following detailed description, taken in conjunction with the accompanying drawing, in which.

In accordance with this invention, an electrical member is provided with a tightly fitting impervious flexible membrane prior to impregnation, which membrane serves to retain the impregnant in the member during solidification of the impregnant, and provides a mold to retain the impregnant in predetermined formation about the outer surface of the windings, to provide a smooth surface which is free from appreciable irregularities.

The invention will be described as it is applied to the insulation of stators for electric motors, but it will be understood that this description is exemplary only, since the invention can be applied with equal facility and with excellent results to transformer coils, field coils, magnet coils, armature coils, and to any electrical member comprising windings with internal voids which are to be filled with an insulating impregnant.

Figure 1:
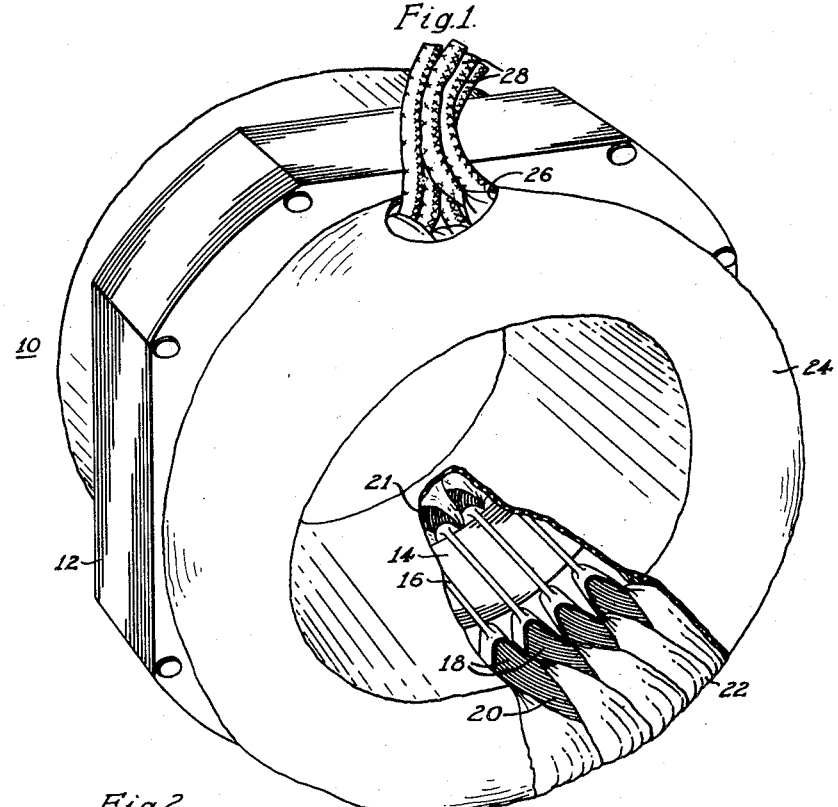
Figure 1 is a perspective view of a dynamo-electric machine stator prepared for impregnation in accordance with the teachings of this invention.

Referring now to Fig. 1, there is illustrated a dynamo-electric machine stator 10 comprising a laminated core 12 having a cylindrical internal bore 14, with coil slots 16 disposed axially on the inner surface thereof. Electrical coils 18 are disposed in the slots 16, and extend beyond the core 12 to form end windings 20 and 21 in the usual manner. The end windings 20 and 21 may have insulating tape 22 disposed thereabout to insulate the coils from one another and to assist in holding them in the proper position.

Disposed about the end windings 20 and 21 and the inner surface of the bore 14 is a membrane 24, which may be formed of a sheet of resinous material, natural or synthetic rubber, or in some cases, cloth. The membrane 24 is so disposed about the end windings 20 and 21 and the inner surface of the bore 14 as to be held in a stretched, tightly fitting condition. The membrane 24 may be sealed or clamped to the outermost lamination of the core 12 about the periphery of each of the end windings. An opening 26 is provided in the membrane 24 to accommodate the stator leads 28.

Figure 2:
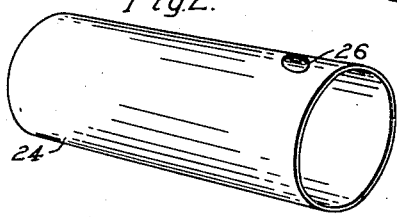
Fig. 2 is a perspective view of a cylindrical membrane utilized in preparing the stator of Fig. 1.

It has been found convenient to assemble the membrane 24 about the stator 10 in the following manner. Referring to Fig. 2 there is illustrated the membrane 24 prior to assembly on to the stator 10. The membrane 24 is composed of a sheet of flexible elastic material, such as polyvinyl alcohol, in the form of a sleeve, having an exterior diameter equal to or slightly greater than the internal diameter of the bore 14 of Fig. 1. The length of the sleeve should be somewhat longer than the overall length of the stator 10. We have found sleeves about twice the length of the stator to be convenient to use. The opening 26 referred to in Fig. 1, formed in the sleeve 24 should be of a sufficient size and in the proper position to accommodate the stator leads 28 when the sleeve 24 is assembled on the stator 10. In some cases, where the stator leads emerge from the coils adjacent to the laminated core, an opening in the membrane is not required but a segment of the proper size and shape may be cut from one end of the membrane so that it can be made to fit closely about the base of the leads. To assemble the sleeve 24 on the stator 10, the stator leads 28 are inserted into the end of the sleeve which is nearest the opening 26, the leads being thrust through the opening from the inside of the sleeve. This end of the sleeve is then stretched over the outer surface of the end windings 20 and pulled toward the laminated core 12, until the end of the sleeve carrying opening 26 is adjacent to the core 12 and this end of the sleeve is then sealed or clamped circumferentially to the core by adhesive or clamps (not shown). The portion of sleeve 24 extending beyond the end windings 20 is then pushed through the stator bore 14, in which process it is turned inside out, to extend beyond the end windings 21. The portion extending beyond the end windings 21 is turned outwardly and stretched back over the end windings 21, and sealed at the core 12 about the outer periphery of the end windings 21 adjacent to the core 12. The sealing operation at either side of the core 12 may be omitted if the sleeve is properly designed, since the stretching of the sheet to accommodate it to the greater diameter of the outside of the end winding causes the membrane to be under circumferential tension, which causes it to fit tightly about the windings.

The stretching of the sleeve in assembly tends to decrease the diameter of the portion within the stator bore, and it has been found desirable to seal the sleeve to the internal surface of the bore. If desired, a cylinder of wood or other suitable material, having a diameter substantially equal to that of the bore 14 may be inserted therein to maintain the portion of the membrane 24 covering the internal surface of the bore 14 in intimate contact therewith, to prevent resin from covering the internal surface of the bore during the impregnation process.

Other methods of assembly may be used. For instance, the membrane sleeve 24 may be inserted through the stator bore, and both ends of the membrane turned back to cover the end windings. The sleeve 24 need not be provided with an opening 26, but the edge of an imperforated sleeve can be brought up to the leads 28, the remainder of the edge being fastened to the core 12, leaving an opening for resin to enter about the leads.

Impregnation of the stator is then accomplished in any conventional manner. The stator is placed in an impregnation vessel, the air evacuated therefrom and impregnant allowed to flow into the vessel to a depth sufficient to cover the stator. Air, nitrogen or other gas, is then admitted to the space in the vessel above the impregnant at atmospheric or higher pressure, to force the impregnant into the stator through the opening in the membrane provided for the end windings. The impregnant itself may be subjected to hydrostatic pressure for this purpose. Other openings may be provided if desired. The stator is then removed from the vessel, maintaining the opening 26 in an upward position, and subjected to a heating operation to cause the impregnant to solidify. For some purposes it is advantageous to heat the stator in a liquid bath, of oil, water, or the like, maintained at the desired temperature, since the hydrotatic head of the oil balances the internal pressure of the impregnant against the membrane, preventing undesirable outward bulges from occurring in the membrane. Other heating means may be used, such as an air baking oven, induction heating apparatus, or by energizing the coils to provide heat from within the stator. The time and temperature of heating will be determined by the size of the coil or other member being treated, and by the type of resin employed in the impregnation.

Particularly good results in practicing the present invention have been obtained when there is used as the impregnant a completely reactive composition such as a solvent reacting varnish capable of being substantially completely converted to the solid state without the evolution of gases or moisture. This type of composition consists of a resinous ester having an unsaturated group dissolved in a polymerizable liquid monomer having the group $H_2C=C<$ copolymerizable therewith. Examples of polymerizable liquid monomers having the group $H_2C=C<$ are monostyrene, paramethyl styrene, vinyl ketones such as methyl vinyl ketone, acrylates such as ethyl acrylate, butyl acrylate and methyl methacrylate, vinyl esters such as vinyl acetate, and allyl compounds such as diallyl phthalate and allyl alcohol. Suitable resinous esters having an unsaturated group are the reaction products of unsaturated acidic compounds having the group

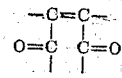

with polyhydric alcohols. Examples of such unsaturated acidic compounds are maleic acid, maleic anhydride, fumaric acid, citraconic acid, citraconic anhydride and chloromaleic acid. These unsaturated acidic compounds may be reacted with glycerol, ethylene glycol, propylene glycol, 1,5-pentanediol, diethylene glycol and castor oil to produce resinous unsaturated esters capable of being dissolved in the liquid monomer. Such liquid compositions can be converted to the solid state by the application of heat in the presence of a catalyst such as benzoyl peroxide, in a manner well known in the art.

Other suitable substantially completely reactive compositions capable of use in the present invention are vinyl compounds capable of polymerizing to polyvinyls, such as methyl methacrylate, allyl compounds such as allyl alcohol or diallyl phthalate, and tung oil or oiticica oil capable of polymerization in the presence of a metallic halide catalyst as disclosed in Patent 2,326,749, issued to Brown et al.

The material of which the membrane is made should be resistant to the action of the impregnant used, and should be sufficiently elastic to permit the stretching necessary during the hereinbefore described assembly operation. Polyvinyl alcohol, polyvinyl chloride, natural or synthetic rubber, or a finely woven cloth, with or without an elastic impermeable surface coating, having a bias cut have been found suitable. With monostyrene present to the impregnant, membranes of polyvinyl alcohol have been found to give excellent results.

The membrane may be coated on the surface adjacent to the coils with a substance such as a soap, such as aluminum stearate, silicone oils, or other parting compounds to prevent the impregnant from adhering to the membrane, so that the membrane can be readily removed after the resin has solidified.

Figure 3:
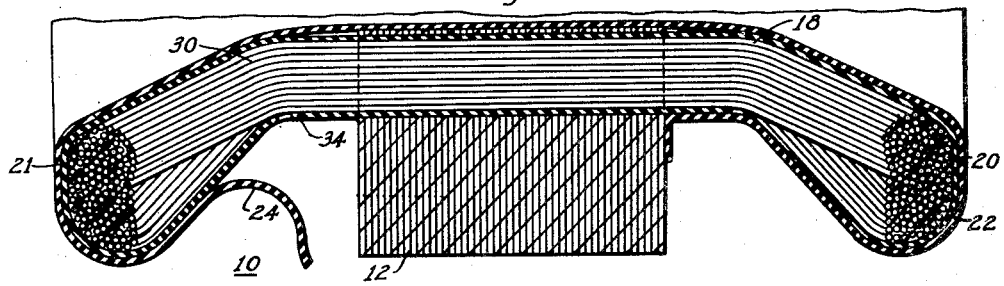
Fig. 3 is a view in section of a portion of the stator of Fig. 1 after impregnation with an insulating varnish.

Referring now to Fig. 3, there is illustrated a view in section of the stator 10, after the impregnation and heat treatment as hereinbefore described. The impregnant 30 has penetrated into all the spaces about the coils within the boundaries of the membrane 24, to provide a voidless insulation in the coil slots 16 and about the end windings 20.

After removal of the membrane 24, the surface 34 of the insulation covering the end windings 20 is found to be smooth and free from any irregularities or projections which would tend to accumulate dirt or lint. In some cases, the membrane 24 need not be removed, but can be left on the stator to provide the desired smooth surface.

The membrane serves as a tightly fitting mold about the windings and the member, yet does not prevent slight volume changes in the resin during solidification, by reason of the flexibility of the membrane, which prevents the occurrence of cracks in the resin which might appear if the resin were rigidly restrained during solidification, since nearly all resins shrink on conversion from liquid to solid polymeric state.

When many electrical members of the same type are to be impregnated, a supply of membranes may be formed beforehand, and assembled on the members at any time before impregnation. Regardless of slight variations in the size and shape of the members, which variations unavoidably are present in manufacturing, the flexibility of the membranes will permit them to be readily assembled on the member.

Since certain changes may be made in the above invention and different embodiments of the invention could be made without departing from the scope thereof, it is intended that all matter contained in the above description shall be interpreted as illustrative and not in a limiting sense.

We claim as our invention:

1. In the process of insulating a stator for a dynamo-electric machine, the stator comprising stacked laminations forming a core having an internal bore with longitudinal slots therein, and electrical windings disposed in the slots and extending beyond the laminations to form end windings and having stator leads connected to the windings, the steps comprising forming a flexible tubular membrane from a sheet of polyvinyl alcohol having an opening therein, applying the tubular membrane to the internal bore of the stator and turning over the ends to cover the end windings and the internal surface of the stator bore with the ends of the tubular membrane in sealed relation against the core, the stator leads passing through the opening in the tubular membrane, sealing the ends of the tubular membrane against the core, providing means within the stator bore to maintain the membrane in intimate contact with the interior surface of the stator, placing the assembly of stator, membrane, and the means for maintaining the membrane in intimate contact with the stator bore in an impregnating chamber, exhausting the air from the impregnating chamber, admitting to the impregnating chamber a liquid solvent reacting composition capable of being converted to the solid state without evolution of gases or moisture, the composition comprising a polymerizable liquid monomer having the group $H_2C=C<$ and an unsaturated resinous ester copolymerizable therewith, the quantity of resin admitted to the chamber being sufficient to cover the stator, applying pressure to the resin whereby the resin is forced through the opening in the membrane for the stator leads into the space enclosed by the membrane, removing the stator assembly from the impregnating chamber, and subjecting the stator assembly to heat for a time sufficient to cause the composition to be converted to the solid state, and subsequently removing the means for maintaining the membrane in intimate contact with the interior surface of the stator bore, and removing the membrane from the stator.

2. In the process of insulating a stator comprising a core and windings for a dynamo-electric machine, the steps comprising encasing the windings in a flexible elastic tubular membrane formed from a sheet of polyvinyl alcohol, the tubular membrane conforming to the shape of the windings, the tubular membrane having been inserted into the stator core opening and the ends of the tubular membrane turned back over the ends of the windings and in sealed relation with the core, the membrane having means therein to accommodate electrical leads to the windings, impregnating the windings within the space enclosed by the membrane by filling the tubular membrane with a solvent reacting composition capable of being converted to the solid state by the application of heat without evolution of gases or moisture, the resin consisting of a polymerizable liquid monomer having the group $H_2C=C<$ and a resinous material copolymerizable therewith, and applying heat to the stator to convert the resin to the solid state.

LAWRENCE R. HILL.
JOHN A. CAMPBELL.

REFERENCES CITED

The following references are of record in the file of this patent:

UNITED STATES PATENTS

| Number | Name | Date |
| --- | --- | --- |
| 1,333,004 | Vaughn | Mar. 9, 1920 |
| 1,767,586 | Hudson | June 24, 1930 |
| 1,888,613 | Apple | Nov. 22, 1932 |
| 2,071,907 | Tattersall | Feb. 23, 1937 |
| 2,104,189 | Cotterman | Jan. 4, 1938 |
| 2,271,468 | Watkins | Jan. 27, 1942 |
| 2,414,525 | Hill | Jan. 21, 1947 |